United States Patent [19]

Sakamoto et al.

[11] Patent Number: 5,689,249

[45] Date of Patent: Nov. 18, 1997

[54] OFF-LANE ALARM APPARATUS

[75] Inventors: Hirofumi Sakamoto; Toshifumi Koshizawa, both of Fujisawa, Japan

[73] Assignee: Isuzu Motors Limited, Tokyo, Japan

[21] Appl. No.: 577,708

[22] Filed: Dec. 23, 1995

[30] Foreign Application Priority Data

Dec. 26, 1994 [JP] Japan ................. 6-322876

[51] Int. Cl.⁶ ............................................. G08G 1/00
[52] U.S. Cl. ................... 340/901; 340/903; 340/904; 340/937; 340/436; 348/148; 348/149
[58] Field of Search ................................ 340/901, 903, 340/905, 904, 436, 437, 435, 937; 348/148, 149, 113

[56] References Cited

U.S. PATENT DOCUMENTS

| | | | |
|---|---|---|---|
| 4,942,539 | 7/1990 | McGee et al. | 364/513 |
| 5,283,640 | 2/1994 | Tilton | 348/42 |
| 5,410,346 | 4/1995 | Saneyoshi et al. | 348/116 |
| 5,530,420 | 6/1996 | Tsuchiya et al. | 340/903 |

*Primary Examiner*—Jeffery Hofsass
*Assistant Examiner*—Daryl C. Pope

[57] ABSTRACT

An off-lane alarm apparatus is disclosed in which upon the increase of the height of a pickup sensor mounted on a car, the increased portion is provided for an image processing device. The image processing device then determines a necessary outside area of a predetermined lane width with other input or switched data to mask an image portion corresponding to the necessary outside area for the car's off-lane detection.

6 Claims, 7 Drawing Sheets

FIG. 4B PLAN VIEW

FIG. 4A SIDE VIEW

F I G. 7

OFF-LANE ALARM APPARATUS

FIELD OF THE INVENTION

1. Field of the Invention

This invention relates to an off-lane alarm apparatus, and in particular to an off-lane alarm apparatus wherein by monitoring a road surface in front of or behind a car by means of an image pickup sensor (hereinafter referred to as a pickup sensor), off-lane or deviation of the car from the traffic white or yellow lane (hereinafter abbreviated as lane) is detected, and an alarm generated.

2. The Prior Art

There have been known measures in which a road is intermittently embedded with protruding things on a lane for giving a driver in a car an alarm for an "off-lane" state in which the car is at least partially out of it's lane with some vibrations or sounds shut within the car occurring when the car erroneously runs on the protruding things due to inattentive or driving or dozing off and the like.

However, such measures must be inefficiently applied to all of the roads and disadvantageously have not yet been applied to any expressway which may cause a big traffic accident. Also, when a driver becomes aware of danger from the vibrations at which tires of the car tread on the lane, a back-mirror or a fender of the car has already entered into an adjacent lane, which may enable the car to collide with a car in the adjacent lane.

Therefore, an apparatus has been recently proposed which utilizes a pickup sensor, e.g. line TV camera taking an image of the front or rear of a car in order to detect a lane for warning of the off-lane state as soon as possible.

Figure 3:
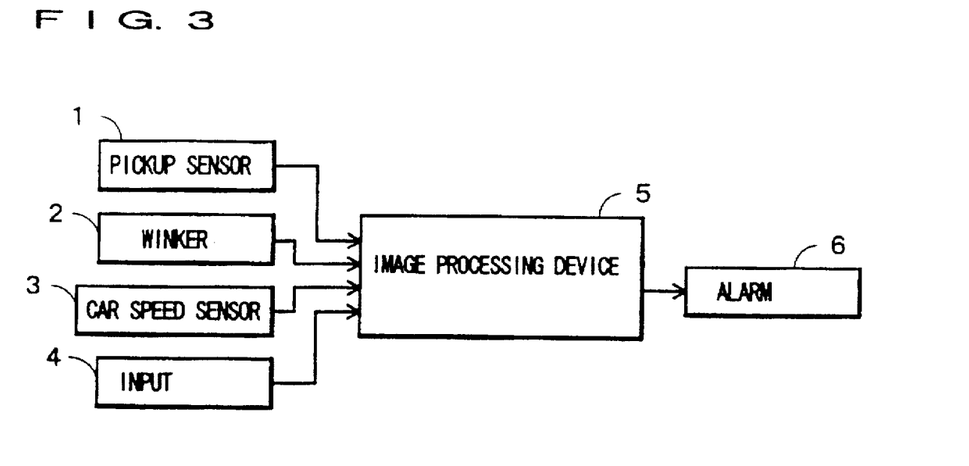
FIG. 3 is a block diagram showing one arrangement of an off-lane alarm apparatus commonly according to the present invention and prior art.

FIG. 3 shows one arrangement of such an off-lane alarm apparatus known in the art, in which output signals from the pickup sensor 1, the winker 2, the car speed sensor 3, and the input means 4, are provided for an image processing device 5 which provides a control signal for an alarm means 6.

In the operation of this off-lane alarm apparatus, after initialization, the image processing device 5 receives an image signal from the pickup sensor 1, a winker signal, i.e. a turn signal, from the winker 2, a car speed signal from the car speed sensor 3, and input data provided through the input means 4 by a driver or operator.

The image processing devise 5 then converts the image signal from the image sensor 1 into binary based on which a lane on a road surface is extracted to calculate the position of the car with respect to the lane in the form of image data on the screen.

The relative position between the lane and the car thus calculated is then checked with reference to various data provided from the input means 4. If the result reveals that the car has come off or is on the point of coming off the lane, the image processing device 5 energizes the alarm means 6 to issue an off-lane alarm in the case where the device 5 receives no turn signal from the winker 5 and the car speed sensed by the car speed sensor 3 exceeds a threshold value.

Herebelow, such a relative position between the lane and the car will be described in more detail.

Figures 4A, 4B:
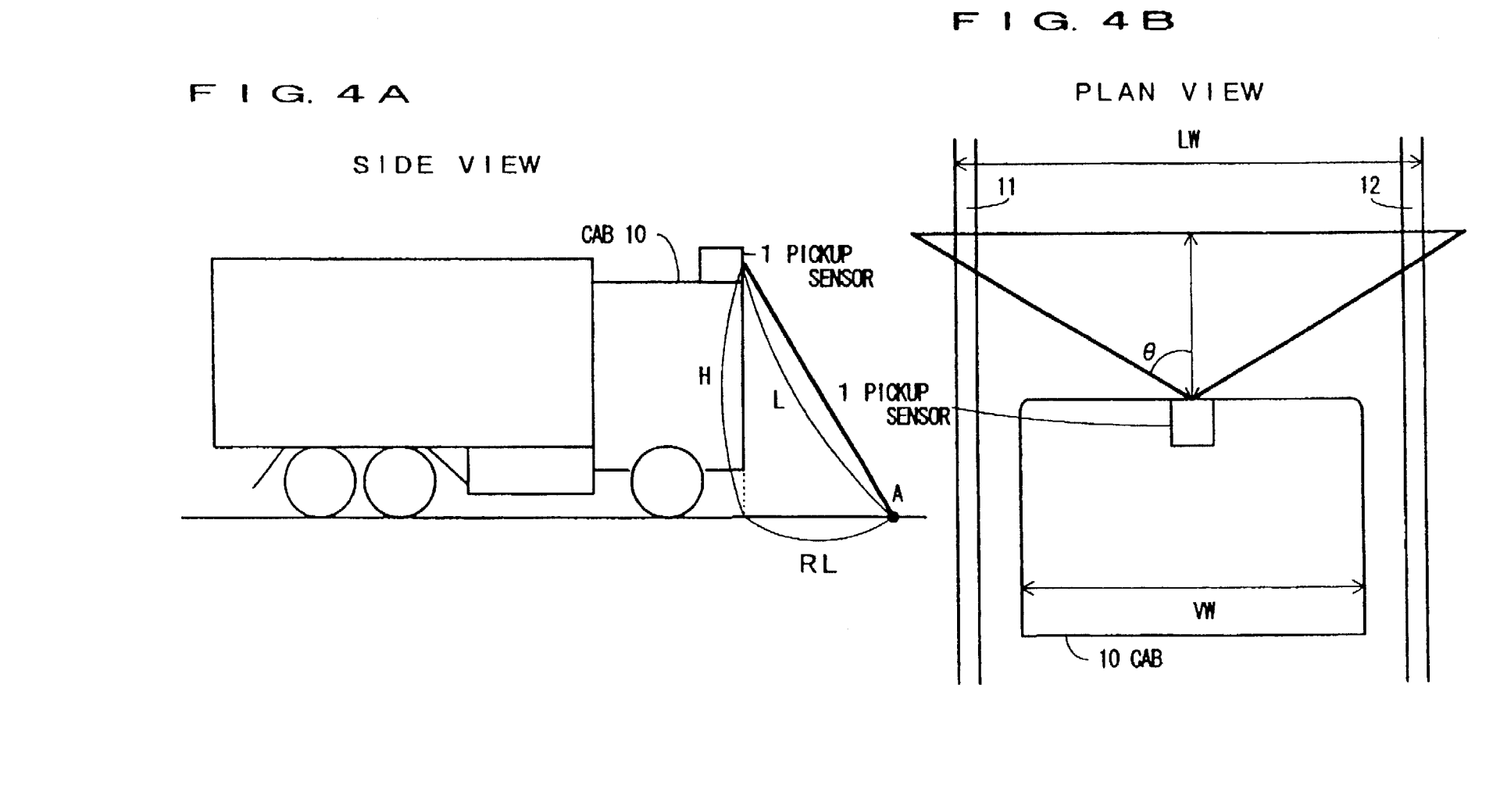
FIGS. 4A and 4B are schematic side and plan views respectively of a car having mounted thereon a pickup sensor used for an off-lane alarm apparatus.

Data provided from the input means 4 comprise a height H of the pickup sensor 1 mounted on the roof of a car cab 10 with respect to the road, a distance RL from the position right beneath the pickup sensor 1 to a predetermined point A on the road, a car width VW, a lane width LW, and a horizontal view angle θ of the pickup sensor 1, as shown in the side view of FIG. 4A and the plan view of FIG. 4B so that an off-lane detection may be made no matter where the cab 10 is relatively positioned with respect to lanes 11, 12.

Figure 5:
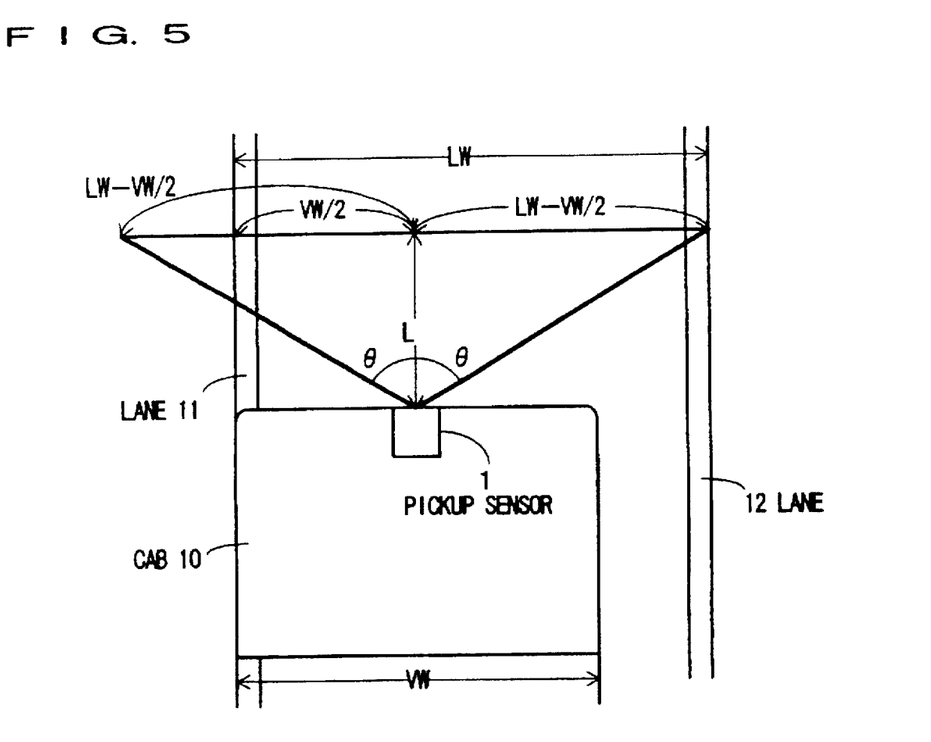
FIG. 5 is a diagram for the illustration of a necessary detection area by a pickup sensor used for an off-lane alarm apparatus.

For example, as shown in FIG. 5, if the car runs in the nearest possible position by the left lane 1, an off-lane can be detected without fail due to the fact that the distance from the pickup sensor 1 to the lane 11 is shorter than a predetermined threshold value VW/2.

However, in the case where the lane 11 is blurred or broken, since the relative position between the lane 11 and the cab 10 is made unclear, it can be determined that the cab 10 comes off the left lane 11, provided that the distance between the opposite lane 12 and the pickup sensor 1 is larger than a threshold value LW-VW/2.

A necessary detecting area is prepared as a range in which an image is taken over a view angle θ enabling the above determinations to be made. To establish such a detecting area, it is necessary to use the pickup sensor 1 with an optical view angle ±θ as given by the following equation:

$$\theta = \tan^{-1}\frac{LW - VW/2}{L} \qquad \text{Eq. (1)}$$
$$= \tan^{-1}\frac{LW - VW/2}{\sqrt{RL^2 + H^2}}$$

Maintaining such a view angle makes it possible to give an alarm even though an off-lane driving occurs on one side where no lane exists in a road having a lane only on the other side, supposing that a lane exists at a point apart by a distance corresponding to a lane width, which is statutorily prescribed, due to a distance from the opposite lane.

Figure 6:
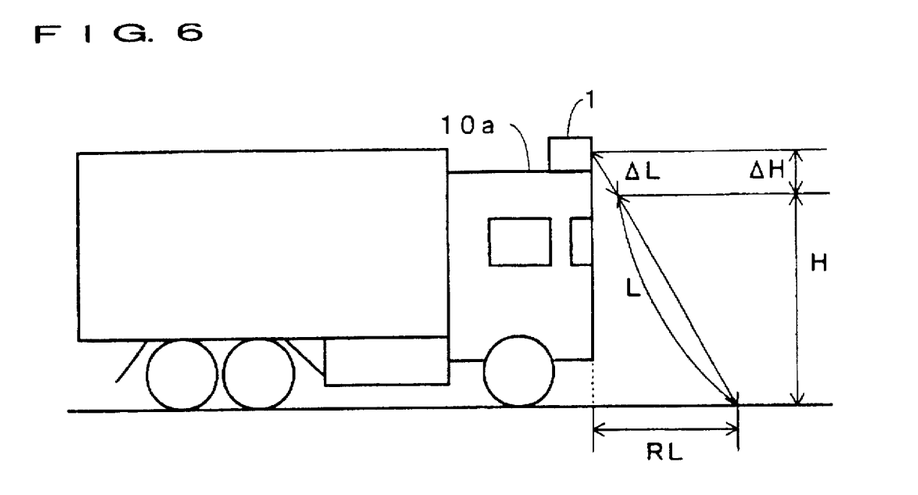
FIG. 6 is a side view showing a state where the mounted height of a pickup sensor is increased from the state shown in FIG. 4A; and, FIG. 7 is a plan view for the illustration of a detected state of unnecessary information upon the magnification of a detected area by an off-lane alarm apparatus according to the prior art.
Figure 7:
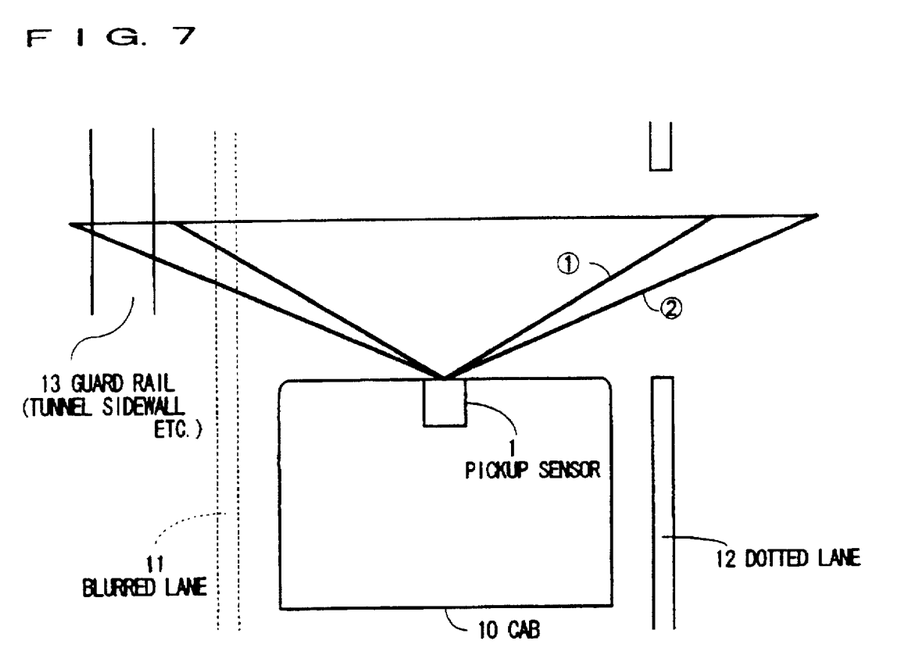

Such a prior art off-lane alarm apparatus gives rise to a problem as shown in FIG. 7 when the pickup sensor 1 is mounted on a roof of a cab 10a, as shown in FIG. 6, which is larger in size than the cab 10 in FIGS. 4A, 4B.

Namely, in case of the pickup sensor 1 being mounted at the lowest height H as shown in FIG. 4A, it is statutorily arranged that a guardrail 13 (or a tunnel sidewall etc.) existing on the left side of the blurred lane 11 does not come into view (visual field) (D, as shown in FIG. 7. If the height of the pickup sensor 1 is increased to a height H+ ΔH as shown in FIG. 6, the view of the pickup sensor 1 is widened to view 2̂ which now includes the guardrail 13 existing on the left side of the lane 11.

In this case, if the right lane 12 is dotted as shown in FIG. 7 and the left lane 11 is blurred, the image processing device 5 will recognize the guardrail 13 as a regular lane on the basis of an image signal provided from the pickup sensor 1.

It is therefore disadvantageous that no alarm is generated although the cab 10 is going to come off the left lane 11 as shown in FIG. 5 from the relative position between the recognized lane, i.e. the guardrail and the cab 10.

SUMMARY OF THE INVENTION

It is accordingly an object of the present invention to provide an apparatus which enables a normal off-lane alarm to be generated without changing its optical mechanism even though a mounted height of a pickup sensor on a car is increased.

For achievement of the above-noted object, an off-lane alarm apparatus according to the present invention comprises an image pickup sensor mounted on a roof of a car; means for generating a turn signal for the car; means for generating an alarm; input means; and an image processing device in which an image signal provided from the pickup sensor is converted into corresponding binary data to extract a lane on a road surface, whereby an off-lane state of the car is detected on the basis of a mounted height of the pickup sensor provided from the input means, a distance between a road position right beneath the pickup sensor and a predetermined sensing position in front of the car, a predetermined lane width, and a predetermined car width, the alarm generating means being then energized by the image processing device unless the turn signal is generated; when the mounted height of the pickup sensor is increased, the image processing device being provided with the increased portion of the height from the input means and determining a necessary outside area of the predetermined lane width by using the inputs provided from the input means so that an image portion corresponding to the necessary outside area is masked for detecting the off-lane state of the car.

According to the present invention, when the mounted height of the pickup sensor is increased, the image processing device receives as an input the increased portion of the height from the input means and determines a necessary outside area of the lane width as predetermined together with other inputs provided from the input means.

The image processing device then masks pixels of the image corresponding to the necessary outside area.

Thus, the image processing device no longer deems what is existing in the masked region, for example a guardrail, as a lane, thereby enabling an off-lane detection to be performed as if the height of the pickup sensor remains unchanged.

In another aspect of the present invention, the increased portion is selectable by switch means used in place of the input means.

In further another aspect of the present invention, a car speed sensor can also be used and the image processing device may detect the off-lane-state of the car when a car speed detected by the car speed sensor exceeds a predetermined value.

BRIEF DESCRIPTION OF THE DRAWINGS

It is to be noted that throughout the Figures, the same reference numerals indicate identical or corresponding portions.

DESCRIPTION OF THE PREFERRED EMBODIMENT

Figure 1:
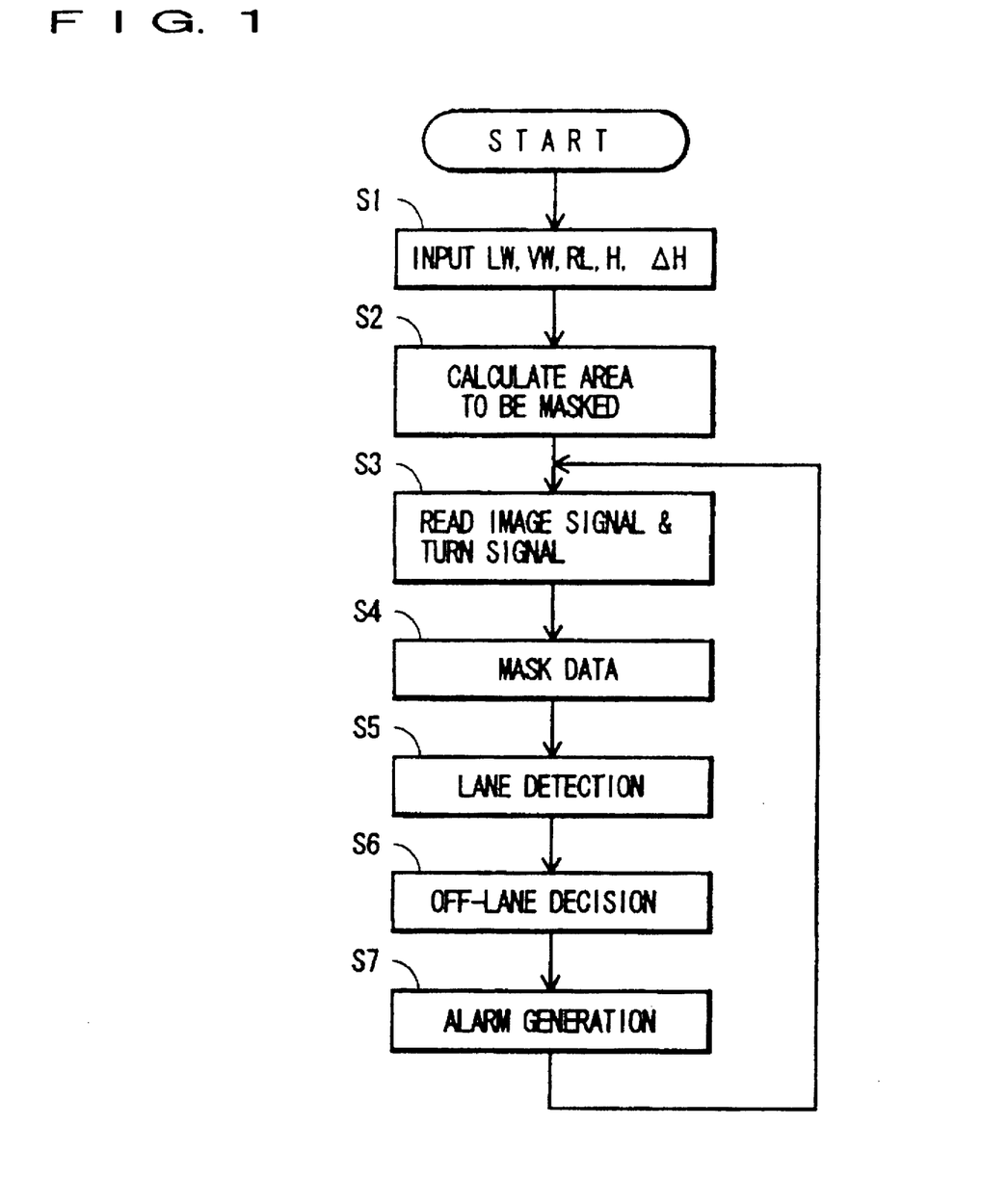
FIG. 1 is a flowchart of procedures executed by an off-lane alarm apparatus according to the present invention.

FIG. 1 is a processing flowchart for a process executed by one embodiment of an image processing device used in an off-lane alarm apparatus according to the present invention.

It is to be noted that the off-lane alarm apparatus according to the present invention may employ the same arrangement as that of the prior art shown in FIG. 3.

Hereinafter, an embodiment of the off-lane alarm apparatus according to the present invention will be described with reference to the flowchart in FIG. 1.

At a first Step S1, the image processing device 5 receives a lane width LW, a car width VW, a distance RL (see FIG. 4A) from the position right beneath the pickup sensor 1 to a predetermined detecting position in front of the car, a mounted height H of the pickup sensor 1, and an increased portion ΔH (see FIG. 6) of the mounted height H of the pickup sensor 1, from the input means 4 as set forth above.

At Step S2, the image processing device 5 calculates an area to be masked by means of data provided from the input means 4.

The masked area ME will be now described with reference to FIG. 2.

An optical detection area SL on a road surface detected by the pickup sensor 1 and increased in its height by ΔH is given by the following Equation.

$$\begin{aligned} SL &= 2(L + \Delta L)\tan\theta \\ &= 2\sqrt{RL^2 + (H + \Delta H)^2}\ \tan\theta \\ &= \frac{2\sqrt{RL^2 + (H + \Delta H)^2}\ (LW - VW/2)}{\sqrt{RL^2 + H^2}} \\ &= 2(LW - VW/2)\sqrt{\frac{RL^2 + (H + \Delta H)^2}{RL^2 + H^2}} \end{aligned}$$

Eq. (2)

Therefore, a necessary outside area OL can be determined by subtracting a necessary detection area having the horizontal length of 2(LW-VW/2) (see FIG. 5) before the mounted height of the pickup sensor 1 is increased from the above optical detection area SL, as given by the following Equation:

$$\begin{aligned} OL &= SL - 2(LW - VW/2) \\ &= 2(LW - VW/2)\sqrt{\frac{RL^2 + (H + \Delta H)^2}{RL^2 + H^2}} - 2(LW - VW/2) \\ &= 2(LW - VW/2)\left(1 - \sqrt{\frac{RL^2 + (H + \Delta H)^2}{RL^2 + H^2}}\right) \end{aligned}$$

Eq. (3)

Figure 2:
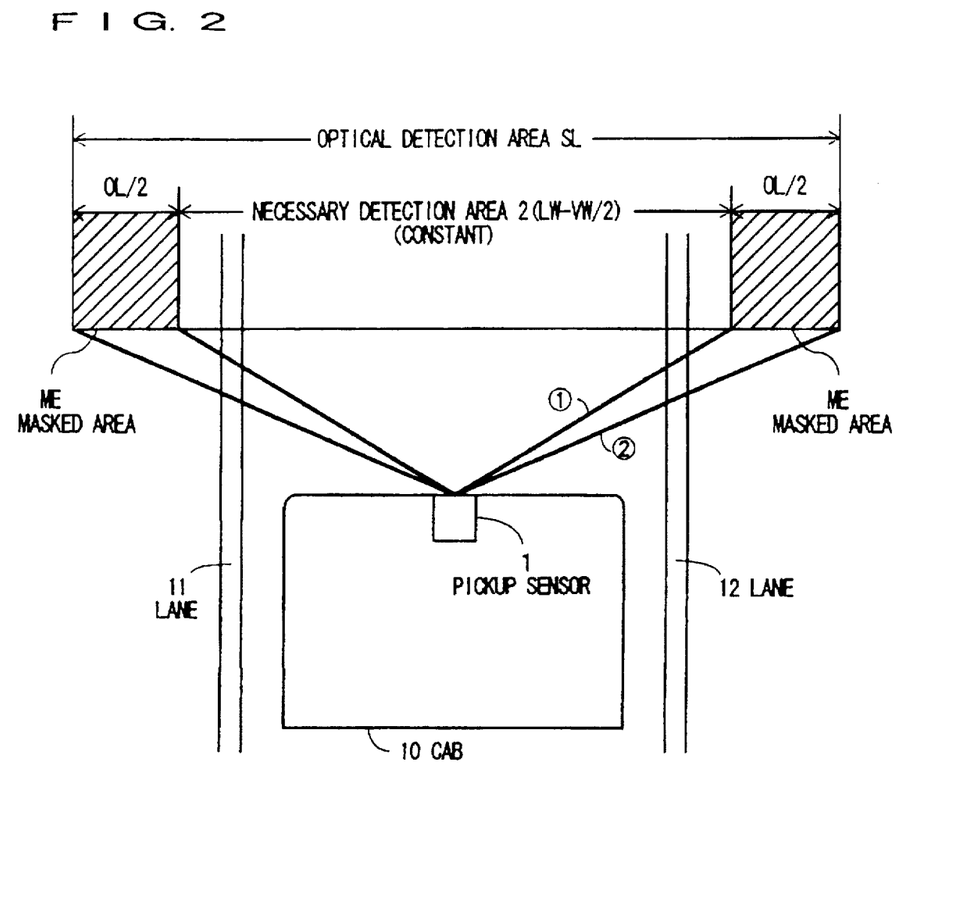
FIG. 2 is a diagram for the illustration of an area to be masked in an off-lane alarm apparatus according to the present invention;.

Thus, as shown in FIG. 2, the masked area ME has ΔL(LW-VW/2)/L as OL/2 of the area length which can be optically detected on both sides of the necessary detection area SL.

Referring back to FIG. 1, at Step S3, after the calculation of the area to be masked, the image processing device 5 reads a turn signal from the winker 2 and a car speed signal from the car speed sensor 3 in the same manner as indicated above with reference to the prior art.

At Step S4, in order to mask the masked area determined at the above Step S2 from an actual screen (not shown), a pixel portion corresponding to the masked area ME is geometrically determined and is masked by means of well-known software processing.

Then, at Step S5, a lane detection processing is performed in a relative positional relationship between the car position and the image signals read at Step S3.

At Step S6, after the detection of the lane, an off-lane decision processing is performed from a relative positional relationship between the lane and the car. In this processing, an off-lane decision is performed on the assumption that the turn signal from the winker 2 gives no directional indication and the car speed provided from the car speed sensor 3 falls below a threshold value.

It is to be noted that the reason whether or not the car speed exceeds the set value is determined is to exclude a case where the car speed is lower than the threshold value, because a car normally runs on a low speed way where a lane is obscure. This determination step for the car speed is not therefore indispensable.

At Step S7, after the off-lane decision, the image processing device 5 energizes the alarm means 6 to generate an alarm output.

It is to be noted that while in the above embodiment the increased portion ΔH of the mounted height of the pickup sensor 1 is given through the input means 4, a variably settable switch may be substituted for the input means 4 in various cars in case where the mounted height of the pickup sensor 1 as well as the increased portion thereof are preliminarily known and selectively changed over to furnish a desirable increased portion ΔH for the image processing apparatus 5.

It is also to be noted that when a car is driven with this off-lane alarm apparatus, the horizontal center of the pickup sensor should be directed to the predetermined position of the distance RL in front of the position right beneath the car.

As mentioned above, an off-lane alarm apparatus according to the present invention is arranged such that upon the increase of the height of a pickup sensor mounted on a car, the increased portion is provided for an image processing device which then determines a necessary outside area of a predetermined lane width with other input data to mask an image portion corresponding to the necessary outside area for the car's off-lane detection. As a result, a detected area can be fixed at the necessary detection area even though the mounted height of the pickup sensor is changed, resulting in the prevention of erroneous alarms due to unnecessary information from being induced.

Having described the present invention by way of the preferred embodiment, it can be seen how the objects of the invention have been attained. As this invention may be embodied in several forms without departing from the spirit of the invention, the present embodiment is therefore illustrative and not restrictive since the scope of the invention is defined by the appended claims and includes such equivalent forms as will be apparent to those skilled in the art.

We claim:

1. An off-lane alarm apparatus comprising
    an image pickup sensor mounted on a roof of a car;
    means for generating a turn signal for said car;
    means for generating an alarm;
    input means; and
    an image processing device in which an image signal provided from said image pickup sensor is converted into corresponding binary data to extract a lane on a road surface, whereby an off-lane state of said car is detected on the basis of a mounted height of said image pickup sensor provided from said input means, a distance between a road position right beneath said image pickup sensor and a predetermined sensing position in front of said car, a predetermined lane width, and a predetermined car width, said alarm generating means being then energized by said image processing device when the off-lane state is detected unless said turn signal is being generated,
    when said mounted height of said image pickup sensor is increased, said image processing device being provided with the increased portion of the height from said input means and determining a necessary outside area of said predetermined lane width by using the inputs provided from said input means, so that an image portion corresponding to said necessary outside area is masked for detecting the off-lane state of said car.

2. An off-lane alarm apparatus comprising
    an image pickup sensor mounted on a roof of a car;
    means for generating a turn signal for said car;
    means for generating an alarm;
    switch means; and,
    an image processing device in which an image signal provided from said image pickup sensor is converted into corresponding binary data to extract a lane on a road surface, whereby an off-lane state of said car is detected on the basis of a mounted height of said image pickup sensor provided from said switch means, a distance between a road position right beneath said image pickup sensor and a predetermined sensing position in front of said car, a predetermined lane width, and a predetermined car width, said alarm generating means being then energized by said image processing device when the off-lane state is detected unless said turn signal is being generated,
    when said mounted height of said image pickup sensor is increased, said image processing device being selectively provided with the increased portion of the height by said switch means and determining a necessary outside area of said predetermined lane width by selecting said switch means, so that an image portion corresponding to said necessary outside area is masked for detecting the off-lane state of said car.

3. An off-lane alarm apparatus as claimed in claim 1, further comprising a car speed sensor, said image processing device detecting the off-lane state of said car when a car speed detected by said car speed sensor exceeds a predetermined value.

4. An off-lane alarm apparatus as claimed in claim 2, further comprising a car speed sensor, said image processing device detecting the off-lane state of said car when a car speed detected by said car speed sensor exceeds a predetermined value.

5. An off-lane detector for use on a vehicle capable of generating a turn signal, comprising:
    an image pickup sensor on the vehicle to produce an image signal;
    an input to input a first height of said image pickup sensor, and a second increased height when the height of said image pickup sensor on the vehicle is increased;
    an image processing device, coupled to said image pickup sensor and said input, to detect an off-lane state of the vehicle based on the image signal, a predetermined lane width, and the first height, said image processing device generating an alarm signal when the off-lane state is detected unless the turn signal is being generated;
    said image pickup sensor being provided with the second increased height when the height of said image pickup sensor on the vehicle is increased, and masking a portion of the image signal based on the second increased height in order to properly detect the off-lane state of the vehicle.

6. An off-lane detector, for use on a vehicle capable of generating a turn signal, comprising:

an image pickup sensor on the vehicle to produce an image signal;

a switch to provide a first height said image pickup sensor, and a second increased height when the height of said image pickup sensor on the vehicle is increased;

an image processing device, coupled to said image pickup sensor and said switch, to detect an off-lane state of the vehicle based on the image signal, a predetermined lane width, and the first height, said image processing device generating an alarm signal when the off-lane state is detected unless the turn signal is being generated;

said image pickup sensor being provided with the second increased height from said switch when the height of said image pickup sensor on the vehicle is increased, and masking a portion of the image signal based on the second increased height in order to properly detect the off-lane state of the vehicle.

* * * * *

UNITED STATES PATENT AND TRADEMARK OFFICE
CERTIFICATE OF CORRECTION

PATENT NO. : 5,689,249
DATED : November 18, 1997
INVENTOR(S) : Sakamoto, et al

It is certified that error appears in the above-identified patent and that said Letters Patent is hereby corrected as shown below:

Title Page
        Section [22] Title: delete "Dec. 23, 1995" and insert --Dec. 22, 1995--.

Column 1, line 2, change "FIELD" to --BACKGROUND--.

Column 2, line 2, change "1" to --11--.

Column 2, line 37, change "(D" to --①--.

Column 2, line 40, change "2̂" to --②--.

Signed and Sealed this

Twenty-fourth Day of March, 1998

BRUCE LEHMAN

Attest:

Attesting Officer     Commissioner of Patents and Trademarks